UNITED STATES PATENT OFFICE.

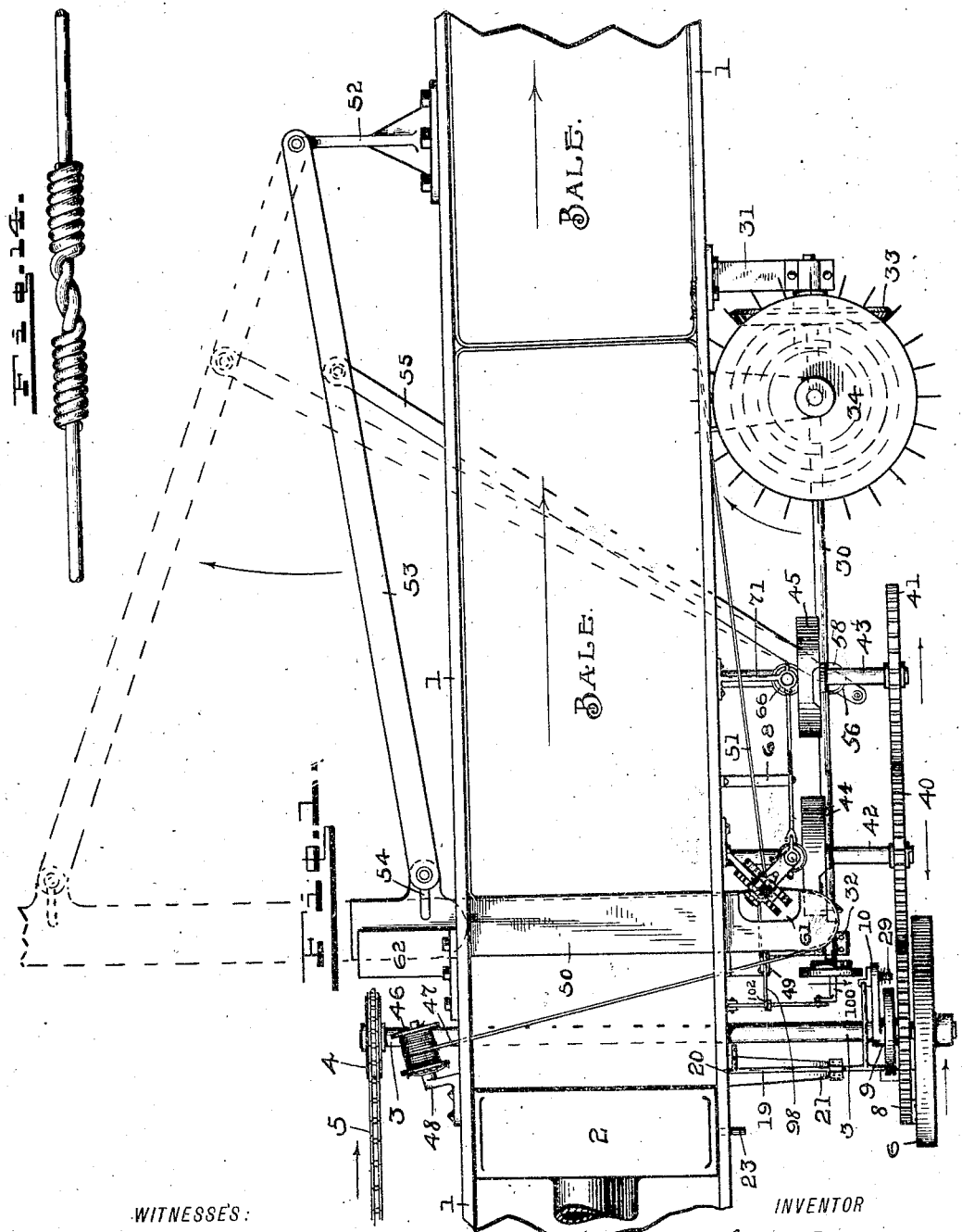

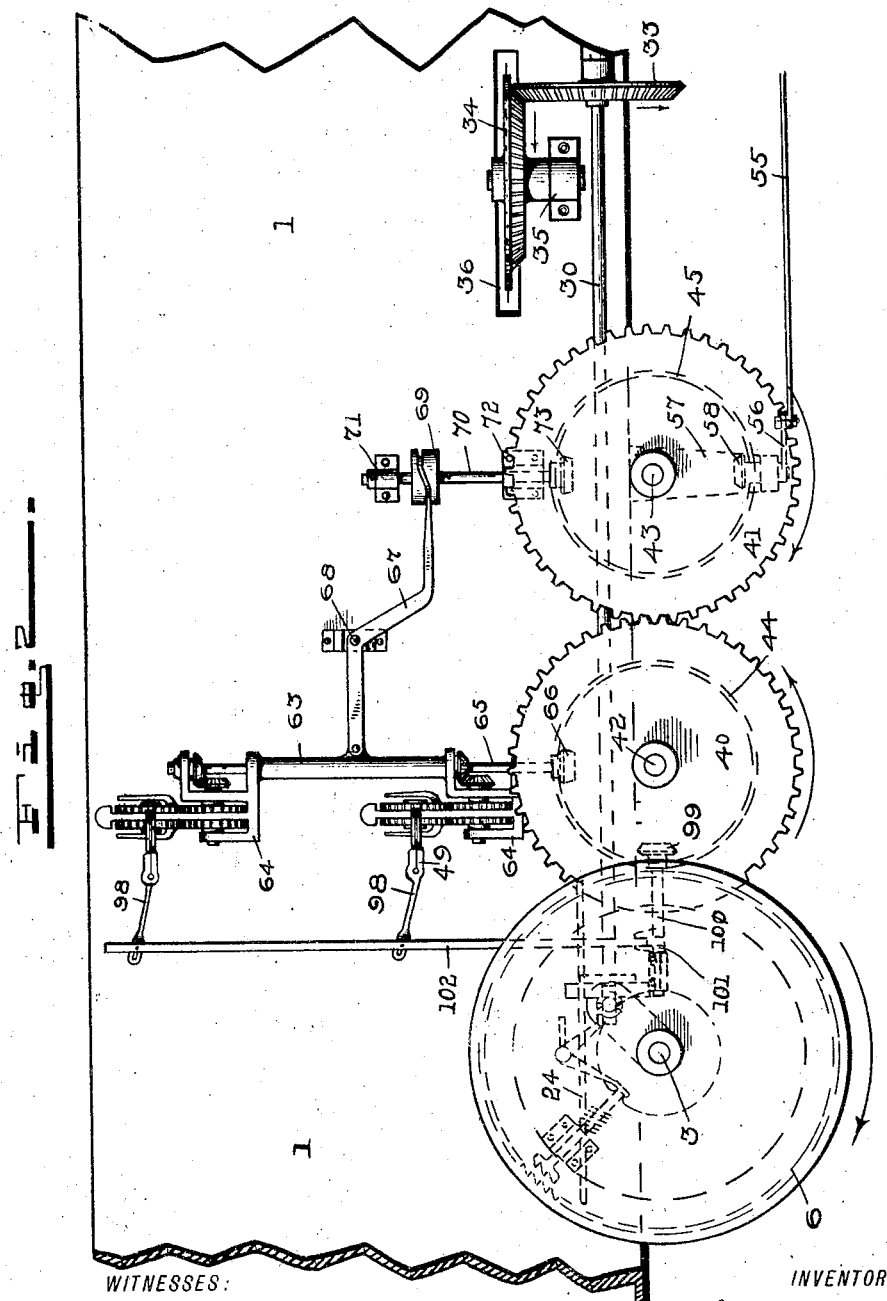

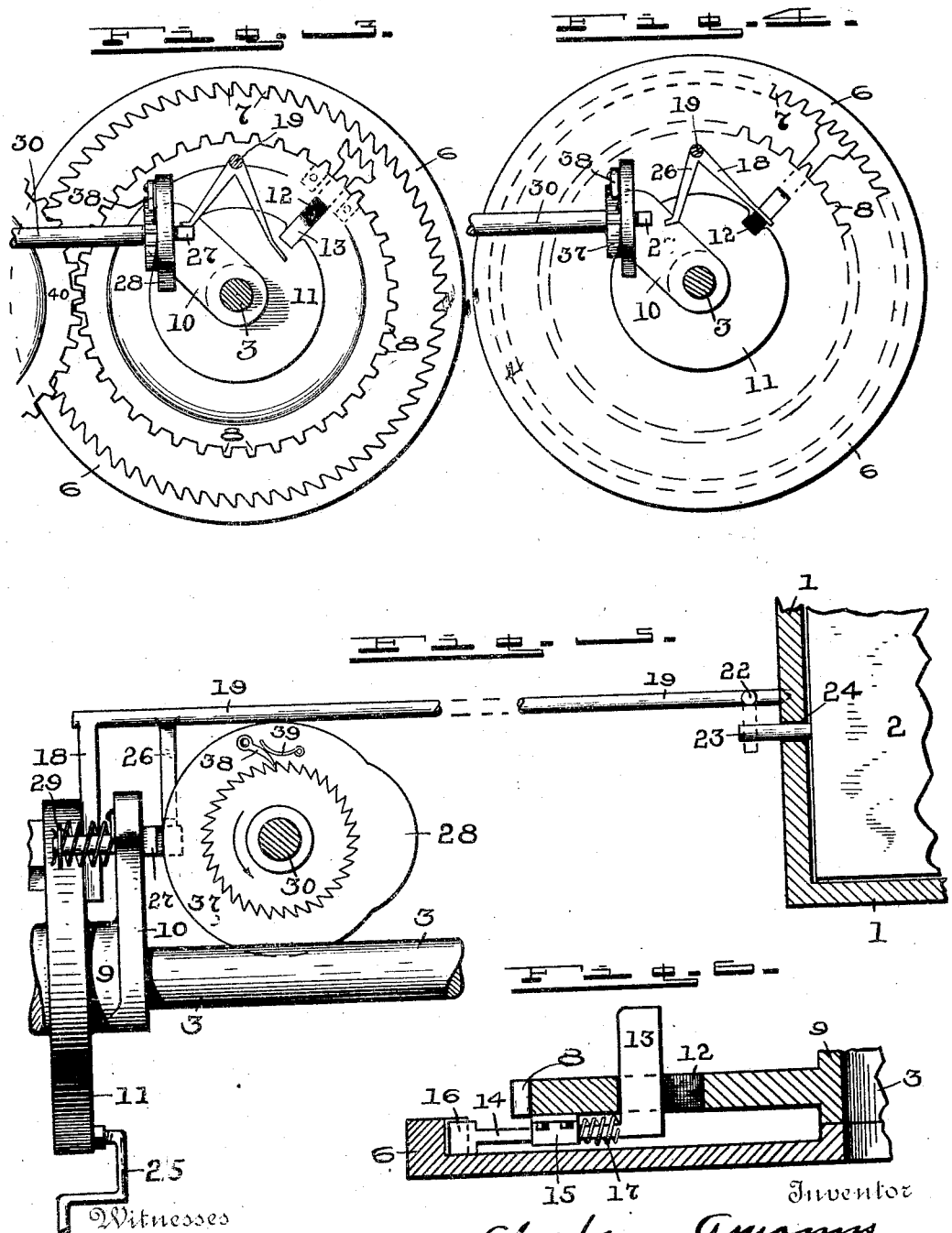

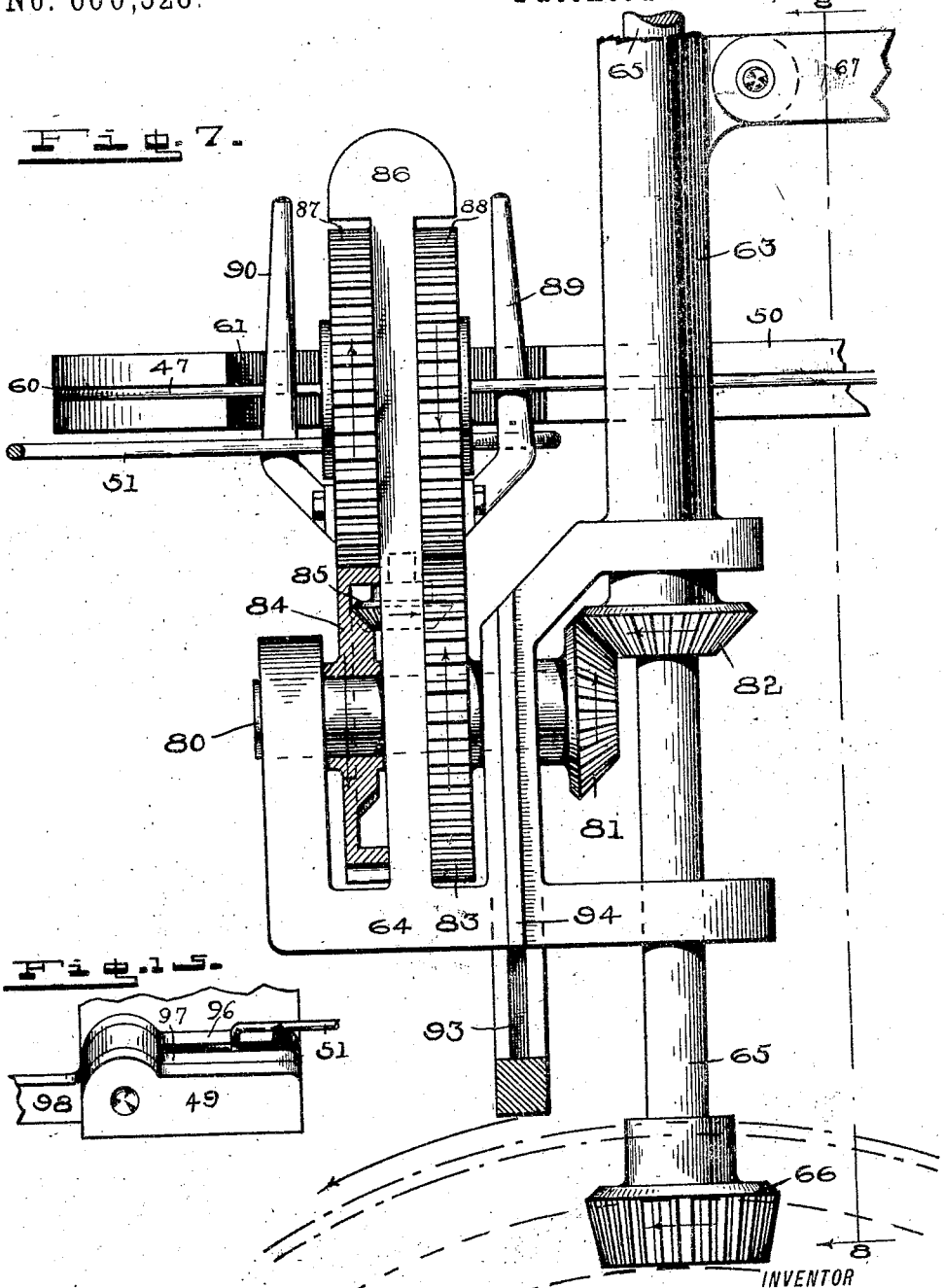

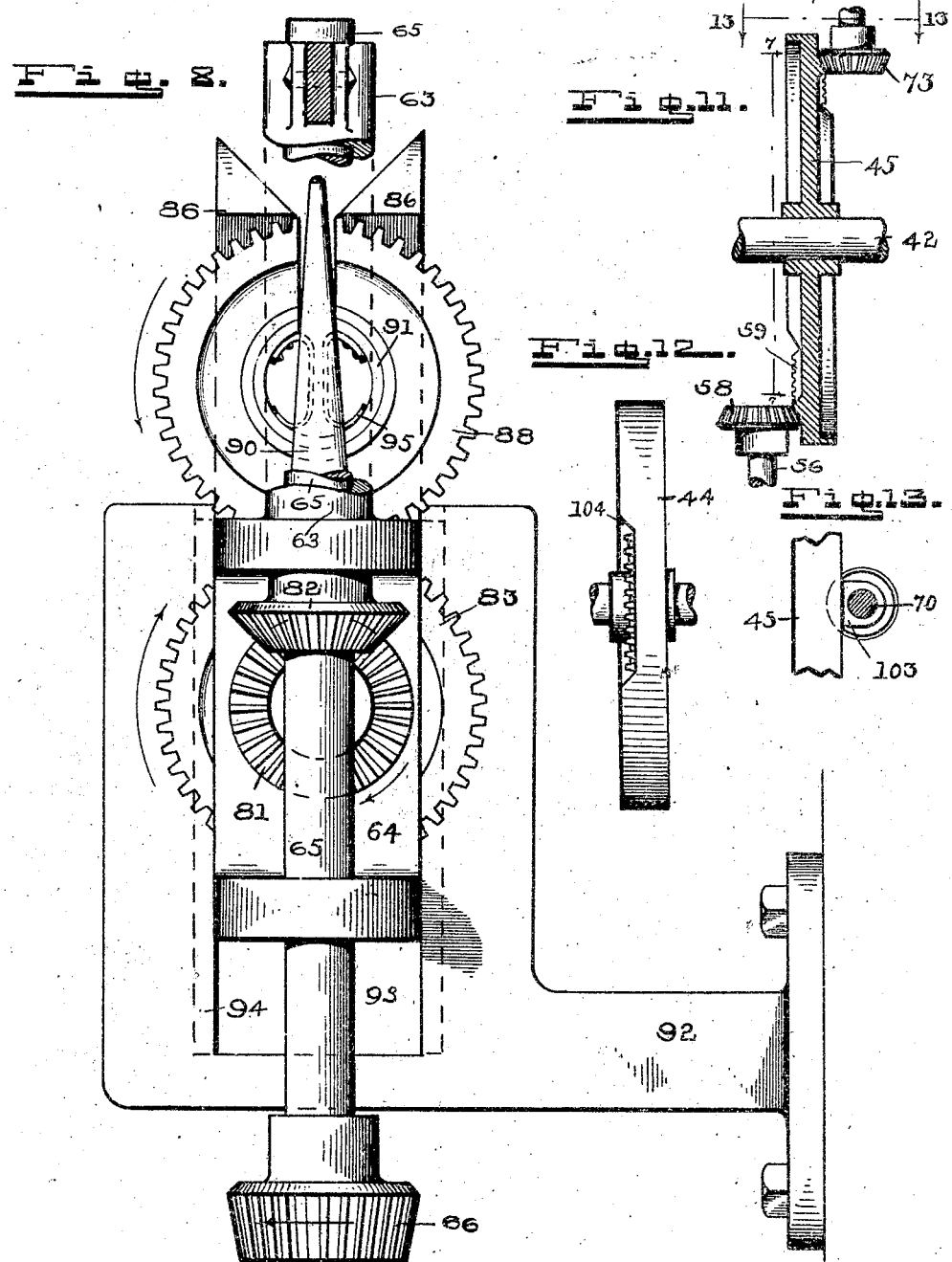

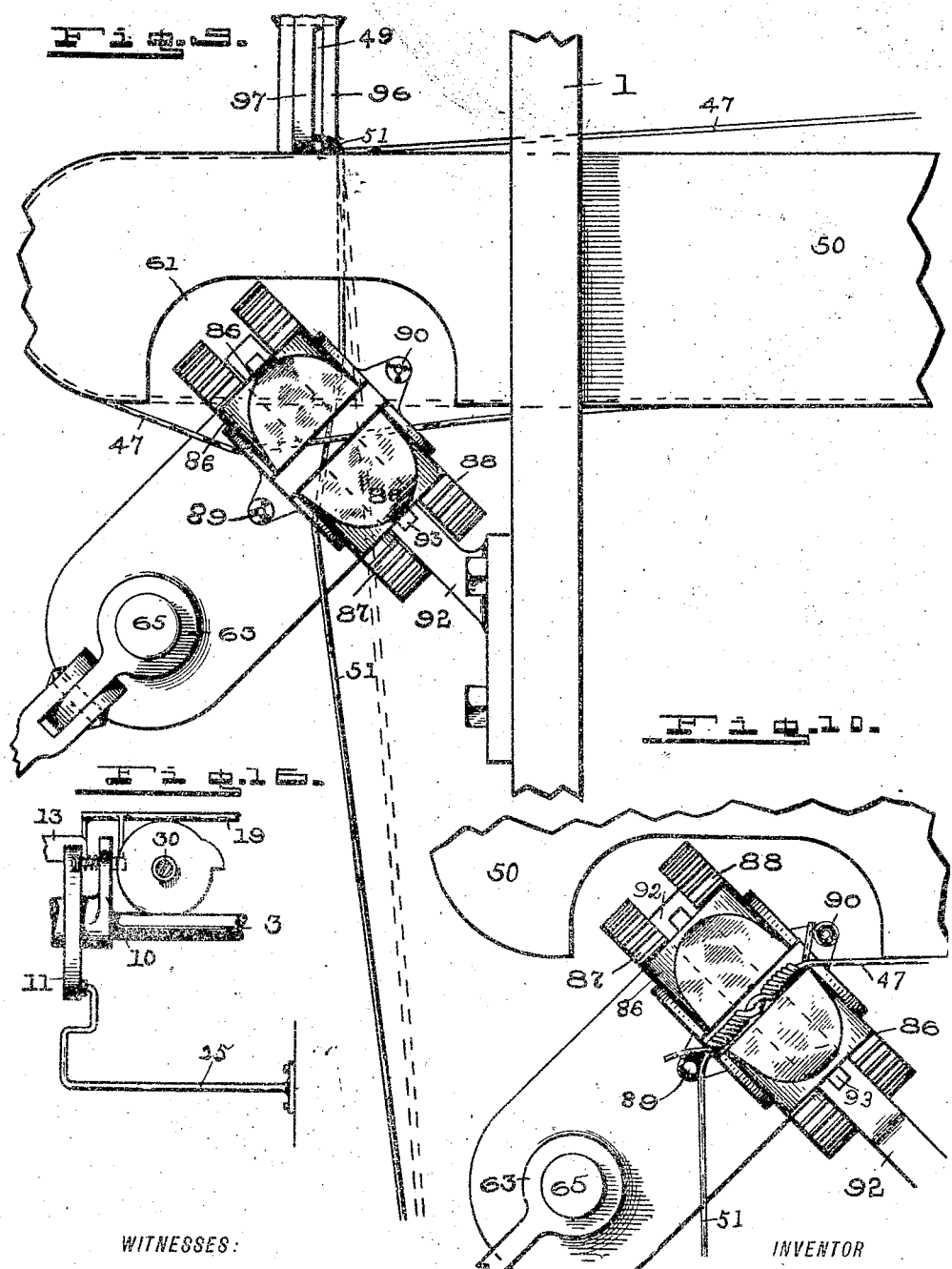

ABRAHAM AMANNS, OF GRAMMER, INDIANA, ASSIGNOR OF TWO-THIRDS TO JAMES V. WRIGHT AND JAMES CHILDERS, OF SAME PLACE.

BALE-TYING PRESS.

SPECIFICATION forming part of Letters Patent No. 600,328, dated March 8, 1898.

Application filed March 8, 1897. Serial No. 626,549. (No model.)

*To all whom it may concern:*

Be it known that I, ABRAHAM AMANNS, of Grammer, county of Bartholomew, and State of Indiana, have invented a certain new and useful Bale-Tying Machine; and I do hereby declare that the following is a full, clear, and exact description thereof, reference being had to the accompanying drawings, in which like figures refer to like parts.

My invention relates to an automatic bale-tying machine to be used in connection with presses of various kinds, whether with the ordinary press for baling hay, excelsior, shavings, and other things or with threshing-machines for baling straw that comes from them.

My bale-tying mechanism is not only automatic in its operation, but also is such that it will make the bale of any desired size.

Broadly speaking, there are four general features or subdivisions of my invention—namely, the tier or knotter mechanism, the mechanism for actuating the needle at the right time, the trip mechanism whereby the plunger will throw the mechanism just mentioned into operation, and the mechanism which determines the size of the bale and which places the trip mechanism in condition to be tripped by the plunger when the bale is large enough. These four subdivisions of the invention, however, are so combined as to constitute, essentially, one machine, the parts coöperating, and the nature of these features of my invention will be fully understood from the accompanying drawings and the description and claims following.

In the drawings, Figure 1 is a plan view of an ordinary form of baling-press supplied with my bale-tying mechanism. Fig. 2 is a side elevation of the same, looking at it from the inner side of Fig. 1. Fig. 3 is an inside elevation of what I will call herein the "driving-wheels" and the parts of the trip mechanism connected therewith, showing the mechanism not in gear. Fig. 4 is the same, showing the drive mechanism of the tier in gear. Fig. 5 is a detailed view of the trip which is connected up with the press-frame and plunger, that are partly broken away, and the cam which forms a part of the mechanism that determines the size of the bale, in connection with the parts of the trip mechanism which it places in condition for actuation by the plunger. Fig. 6 is a cross-section on the line 6 6 of Fig. 4. Fig. 7 is a side elevation of the knotter or tier mechanism. Fig. 8 is an end view thereof, looking at it from the standpoint of 8 8 of Fig. 7, the driving-shaft and bracket being partly broken away. Fig. 9 is a plan view thereof with the tying process just commenced, the needle being broken away in parts. Fig. 10 is the same with the tying process completed. Fig. 11 is a vertical cross-section of the wheel that actuates the needle, showing gear on each side thereof. Fig. 12 is a plan view of the same, showing the indentation in the rim thereof. Fig. 13 is a cross-section on the line 13 13 of Fig. 11, showing the box on the shaft carrying the upper bevel-gear. Fig. 14 is a detail of the knot tied by the knotter herein shown. Fig. 15 is a perspective, on a large scale, of the wire holder and cutter. Fig. 16 shows the means for holding the trip-wheel stationary.

In detail, 1 is a frame of a baling-press, Fig. 1 showing therein one bale that is being tied and a portion of a bale that has been tied. The bale is formed by the plunger 2, that is operated by any suitable machinery. This part of the mechanism constitutes no part of my invention, but is merely selected from the various forms of baling-presses to suitably illustrate my bale-tying machine.

The shaft that drives the bale-tying mechanism is marked 3 and extends across under the press-frame, as shown in Fig. 1. On one end it has a sprocket-wheel 4, about which there passes a sprocket-chain 5, connected up with suitable driving machinery. On the other end of said shaft 3 I secure a drive-wheel 6, to be seen in Figs. 1, 2, 3, 4, and 6. On the side of said drive-wheel toward the press it is provided with internal gear 7, as seen in Figs. 3 and 4.

On the shaft 3, adjacent to the drive-wheel 6, I mount loosely a spur-gear 8, that is shown in Figs. 1, 3, 4, and 6. The said spur-wheel 8, when it is geared up with the drive-wheel 6, drives the knotter, needle, and cutter. The spur-gear 8 has a head or sleeve 9 extending inwardly, to the inner end of which there is secured an arm 10. On the sleeve or hub 9 I mount a stationary wheel 11, to be seen in Figs. 1, 3, 4, and 5. In the periphery of said wheel 11 there is a notch. (Seen in Figs. 3 and 4.)

The wheels 6 and 8 are connected by the clutch mechanism shown most clearly in Fig 6 and also in Figs. 2, 3, and 4. In Fig. 6 it will be observed that there is a radially-extending opening 12 through the wheel 8, through which there extends a bar 13, having an upward projection 14 on its end between the two wheels 6 and 8 that extends through a guide-bracket 15 on the side of the wheel 8. The projection or arm 14 carries on its outer end a series of teeth 16, that are adapted to engage the internal gear 7 on the inner side of the wheel 6. Between the bracket 15 and the bar 13 I place a spiral spring 17 about the projection or arm 14, as seen in Fig. 3, for the purpose of pushing the teeth 16 away from the internal gear of the wheel 6 when the mechanism hereinafter described is not pushing the same outward. When the parts just described are in the position shown in Figs. 4 and 6, the two wheels 6 and 8 are locked together, whereby the wheel 8 will be actuated. When these parts are in the position shown in Fig. 3, the said wheel 8 will not be actuated. It is observed that the opening 12 in the wheel 8 is adapted to register with the notch in the wheel 11, as seen in Fig. 4, the purpose of which will hereinafter appear.

The clutch mechanism shown in Figs. 3, 4, and 6—namely, the bar 13, arm 14, and teeth 16—is actuated by the trip-arm 18, that is secured to the rock-shaft 19. (Shown in Figs. 3 and 4, and most clearly in Fig. 5.) The rock-shaft 19, as seen, is mounted in the framework of the press at 20, and the other end is carried by the bracket-arm 21, which is secured to the side of the press, as seen in Fig. 1. On the inner end of said rod 19 there is a short arm or finger 22. (Shown most clearly in Figs. 1 and 5.) When the rock-shaft is so turned by the mechanism to be hereinafter described, that the finger or arm 22 extends downward as shown in dotted lines in Fig. 5, it will be engaged by the pin 23, secured to the plunger 2 and extend through a slot 24 in the side of the framework. (Shown in dotted lines in Fig. 2.) As the plunger reciprocates the pin 23 moves to and fro through said slot.

In the operation of the machine the pin 23 engages the pin 22 on the return movement of the plunger, whereby the pin 22 will be pushed backward somewhat, thus actuating the rock-shaft 19, so as to move the arm 18, as seen most clearly in Figs. 3 and 4, against the bar 13, thus by the mechanism heretofore described and shown in Figs. 4 and 6 causing the connection between the wheels 6 and 8 whereby the wheel 8 is driven. In this movement the arm 18 has moved the bar 13 out of the notch in the stationary wheel 11, as seen in Fig. 3, into the position shown in Fig. 4. After the plunger-pin 23 has passed the pin 22 the rock-shaft 19 will return to its former position, so that the arm 18 on it will return from the position shown in Fig. 4 to that shown in Fig. 3; but the clutch mechanism 13, 14, and 16 will be held outward by the periphery of the stationary wheel 11. In other words, the bar 13 rides around on the periphery of said stationary wheel until it reaches the notch in said wheel, into which it drops, as seen in Fig. 3, and then the wheel 8 is out of gear. The wheel 11 is held stationary by the brace 25, that is connected up with the framework, as shown in Fig. 16.

The arm or finger 22 is held out of engagement with the pin 23 on the plunger as it passes by the arm 26, that extends from the rock-shaft 19 and rests upon or is supported by the piece 27, which is carried in the outer end of the large arm 10. This is to be seen in Figs. 1, 3, 4, and 5. Said piece 27 is so carried in the arm 10 that it can be pushed backward against the face of said arm by the cam-wheel 28, thus permitting the arm 26 from the rock-shaft 19 to escape at times. After the cam projection has passed and the arm 26 has escaped from the piece 27 it is drawn into its normal position by the coil-spring 29. In operation the pin 23 on the plunger 2 does not engage the pin 22 on the rock-shaft 19 and through the mechanism heretofore described start the tying machinery until the mechanism heretofore described through the cam 28 has pushed inward the piece 27 and permitted the arm 26 to drop down from the position shown in Figs. 3 and 5 to that shown in Fig. 4. Then the pin 22 is in the position shown in dotted lines in Fig. 5 and is subsequently engaged by the pin 23. As has been stated, through this mechanism the wheel 8 is actuated and makes one rotation until the bar 13 drops into the notch in the stationary wheel 11. During such rotation the arm 10 also rotates, and since the piece 27 has been disengaged by the cam it rebounds inward toward the press, and when the piece 27 on the arm 10 in such rotation engages the arm 26 from the rock-shaft 19 it picks it up and elevates it, as shown in Figs. 3 and 5, and thereby holds the pin 22 out of the path of the pin 23, as shown in Fig. 5.

Having now explained the construction and operation of what I have heretofore termed the "trip" mechanism of my machine, I will proceed with the description of the mechanism that determines the size of the bale and puts the trip mechanism into condition for operation.

By referring to Figs. 1 and 2 there will be observed a horizontal shaft 30, extending parallel with the side of the press-frame and carried in the brackets 31 and 32, secured to the frame. On the right-hand end of said shaft I secure a bevel-gear 33, that meshes with the bevel-gear on the under side of what I shall here call the "gage-wheel" 34, that is mounted in the bearing 35, secured to the side of the press-frame, as is seen in Fig. 2. The gage-wheel 34 is mounted horizontally, and its periphery is provided with spurs that extend through the opening 36 in the side of the press-frame and are engaged by the material in the bale as it is pushed through the press by the plunger. Therefore the gage-wheel is actuated by the material being pressed as it passes along. The gage-wheel 34 as it is actuated in turn actuates the bevel-gear 33 and shaft 30. On the left-hand end of the shaft, as seen in Figs. 1 and 2, I loosely mount the cam-wheel 28, heretofore referred to. It is actuated by the ratchet-wheel 37, that is secured on the shaft 30, and engages the pawl 38, that is pivoted on the side of the cam-wheel 28, and is held in engagement with the ratchet-wheel 37 by a spring 39. This construction is shown most clearly in Fig. 5. The purpose of the ratchet means of actuating the cam 28 is to permit the cam 28 to move forward freely on the shaft 30 if the cam extension thereon should be engaged by any part of the trip mechanism.

Since the cam 28, as we have seen, starts the trip mechanism every time it makes one revolution and it in turn is actuated by the gage-wheel 34, the trip mechanism will be set in operation when a bale of a certain length has been formed, and then the tying mechanism is started and the bale tied. This brings about uniformity in the size of the bales tied. In order to adjust or predetermine the size of the bales, the gage-wheel 34 is provided on its under side with a series of bevel-gears concentric and of predetermined diameters, so that by setting the bevel-gear 33 farther inward on the shaft 30 to enable it to engage a bevel-gear of smaller diameter larger bales will be formed. The series of bevel-gears on the under side of the gage-wheel 34 is shown in dotted lines in Fig. 1. The number and diameter of them may be made to suit the work to be done.

Turning now to the tying mechanism proper, I will state at the outset that it is driven from the spur-wheel 8 by the spur-wheels 40 and 41, rigidly mounted, respectively, on the shafts 42 and 43, that extend horizontally from the framework of the press and are seen in Figs. 1 and 2. On such shafts are mounted the drive-wheels 44 and 45, respectively, that directly drive the needle and tying mechanism.

In Fig. 1 there will be observed on the back side of the press a spool 46, on which there is wound the wire 47, said spool being mounted rotatably on a bracket 48. At the beginning of the operation the end of the wire is taken across in the position shown at the left hand of Fig. 1 and its end is secured in the wire cutter and holder 49. As the material to be pressed is forced against it by the plunger, the wire will be pushed forward around the front end of the bale. As the wire is pushed forward it will come into engagement with the groove in the end of the needle 50 when the needle is in the position shown in dotted lines in Fig. 1, as the end of the needle then extends only to the back side of the press. The held end of the wire when the bale has been formed will assume the position of the wire marked 51 in Fig. 1 and shown in dotted lines in Fig. 9. At that stage of the operation—that is, when the bale has been formed—the mechanism which has been heretofore described will set in operation the needle and tying mechanism. The needle 50 is forced horizontally through the press behind the bale, as seen in Fig. 1. This is done by the following mechanism: On the rear side of the press I secure the bracket 52, to which I pivot a lever 53, that is pivoted in the slot 54 in the rear end of the needle. From the lever 53, at a point between its ends, I pivot a link 55, that extends vertically down to a point below the press and then horizontally across under the press, as shown in Figs. 1 and 2, with its other end pivoted to a crank 56, as seen in Figs. 1 and 2. This crank is mounted in a bracket 57, (shown in dotted lines in Fig. 2,) that is secured to the framework of the press and extends downward at an inclination outward away from the press to the wheel 45. The crank is actuated by the bevel-gear 58. (Shown in Figs. 1, 2, and 11.) It meshes with the segment-gear 59 on the outer side of the drive-wheel 45 and is to be seen in Fig. 11. The cogged segment 59 is short, and therefore the wheel 45 actuates the bevel-gear 58 during only a small portion of its revolution, as but slight actuation is necessary to cause the link 55, through the lever 53, to move the needle 50 into the position shown in Figs. 1, 9, and 10. This is the first mechanism set in operation after the trip mechanism heretofore described has operated. The needle is preferably formed as seen in Figs. 1, 7, 9, and 10. It has a rounded end, with a groove 60 in it to receive the wire 47. This is the same as the needle shown in a prior patent, No. 574,699, issued to me January 6, 1897. In one side of the needle I cut out a large recess 61, so that when the needle has been forced through after the bale has been formed the wire will extend across the mouth of said recess 61, as seen in Fig. 1 and in dotted lines in Fig. 9. The mechanism for inserting the needle should be such as to move it only so far that the other end 51 of the wire will extend across the end of the wire I have just mentioned at about right angles and at a point about midway between the two ends of the recess 61 in the needle, as is seen in Figs. 1 and 9. The needle moves in a guide 62, to be seen in Fig. 1, through suitable openings made in the framework of the press.

At this stage of the description and operation the wire and other parts are in the position to be seen in Fig. 1, and the next thing is to tie the wires at their place of crossing. Immediately beneath the place of crossing I place the tier or knotter that is seen in Fig. 2. I show there a pair, so as to tie a wire near the lower part of the bale and another one near the upper part of the bale. The number of these may be increased to suit the number of bands it is desired to put about a bale, and also it must be noted that there must be one needle for each tier, each of which is arranged as that shown in Fig. 1 and is actuated by the link 55 and the mechanism heretofore described.

Assuming now that the tiers shown in Fig. 2, for example, are immediately beneath the crossed wires, I will proceed with an explanation of the construction of the tier and its operation. In Fig. 2 there is observed a sliding frame 63, that supports a framework 64, having a tier at each end. It slides on the shaft 65, which has on its lower end a bevel-gear 66 to drive it, the same appearing engaged in Fig. 7. The tiers are elevated into engagement with the crossed wires for tying the same by the lever 67, that is pivoted on the rod 68, that is secured to the framework of the press. Said lever is operated by the wheel 69, secured on the vertical shaft 70 and provided in its periphery with a serpentine or cam groove in which the end of the lever 67 extends and operates. As said wheel 69 is rotated it is obvious that it will depress the end of the lever 67, and thus elevate the tiers. The vertical shaft 70 is mounted in bearings 71 and 72, that are connected up with the frame of the press. On the lower end of said shaft 70 I secure a bevel-gear 73, that engages the cogged segment on the inner side of the wheel 45 and is thereby driven.

The construction of the tier is illustrated chiefly in Figs. 7 and 8. In the frame 64 I mount a horizontal shaft 80, on one end of which there is a bevel-gear 81, that meshes with the bevel-gear 82, which is so mounted on the shaft 65 as to slide thereon but rotate therewith. Hence it is actuated always by said shaft and in turn rotates the shaft 80. On the shaft 80 there is secured a spur-wheel 83, having on its inner side a bevel-gear like that shown in the inner face of the wheel 84 for the purpose of engaging and driving the bevel-gear 85, which is mounted by means of a spur-axle (shown in dotted lines in Fig. 7) in the frame between the two guide-prongs 86, to be seen in said Fig. 7 and 8. They form a part of the framework 64 and are connected just above the bevel-gear 85, as shown in dotted lines in Fig. 7. The said bevel-gear 85 rotates the spur-gear 84, which is loosely mounted on the shaft 80, in a direction opposite to the rotation of the gear 83. These in turn actuate the spur-wheels 87 and 88, respectively. To the sides of said wheels 87 and 88 are secured the twister-prongs 89 and 90, and as the wheels 87 and 88 rotate in a reverse direction the twister-prongs will likewise rotate in opposite directions, and thus effect the twisting.

The two guide-prongs 86, that extend up from the framework, are separated, as shown in Fig. 8, with their upper ends beveled downward and inward, as therein shown. They extend above the wheels 87 and 88, which they carry, and also above the prongs 89 and 90. The wheels 87 and 88 are mounted on the bearing 91, that is carried by the two guiding-prongs 86, it being set into a seat made for it by cutting out a curved portion of each of said prongs at opposite points, as seen in Fig. 8. The said bearing is cut out in its upper portion to permit the entrance of the wires to be twisted in said bearing, and likewise the two spur-gears 87 and 88 are similarly cut out, as seen in Fig. 8, and such cut-out portions correspond to and register with the space between the two guide-prongs 86.

Before the tiers are elevated the parts are in the position shown in Fig. 9 with relation to the wires dotted therein. As the tier is elevated the inclined inner face of the heads of the guide-prongs 86 change the position of the wires from that shown in dotted lines to that shown in the full lines in said Fig. 9. Thus instead of crossing each other at right angles the wires cross each other so as to form the letter X, as seen in said figure. In other words, said guiding-prongs tend to bring the wires parallel with each other, so that the twisting-prongs 89 and 90 may engage both of the wires, as seen in Fig. 10.

After the tier has been pushed up into the position shown in Fig. 9 until the wires have entered the hollow of the bearing 91 the shaft 65, as seen in Figs. 7 and 8, begins to operate, and by means of the mechanism heretofore described rotates the spur-wheels 87 and 88 and the twister-prongs 89 and 90. Since these twister-prongs engage both wires, they twist them about each other, as seen in Fig. 10, thus making the straight or what is called the "telegraph" twist, as seen in Figs. 10 and 14.

To insure the exact location and vertical movement of the tier, I provide a guide-bracket 92, as seen in Figs. 7, 8, 9, and 10, that is secured to the side of the press and has in it a guideway or slot 93, in which flanges 94 on the frame 64 move. It is observed in Figs. 7 and 8 that the tier has been elevated. It is also observed that the pathway for the wires between the two guiding-prongs 86 and through the spur-wheels 87 and 88 and the hub 91 grows smaller and tapers from the lower end of the bevel of the said guide-prongs 86. To hold the wires together somewhat after they enter the hub 91, I provide a spring of some kind—for example, like 95 to be seen in Fig. 8.

Immediately after the twister has begun to operate the cutter and wire-holder mechanism begin to operate. The nature of this cutter and wire-holder is the same as that shown and described in my prior patent, No. 574,699, dated January 5, 1897, there being nothing new excepting the means for operating the same. The nature of the holder and cutter mechanism will appear in Figs. 2, 9, and 16. There is a stationary jaw 96, provided with one side somewhat higher than the other and with a recess, in which the cutter-jaw 97 operates. It is pivoted on the rear of the stationary jaw 96 and is integral with the handles 98 to be seen in Fig. 2, as has been explained in my former patent. After the cutting-jaw 97 is operated on one side of the stationary jaw 96 to cut the wire there is space enough on the other side of the movable jaw 97 to hold the wire fast between it and the fixed jaw, as is seen in Fig. 9 and will more fully appear from the description in my former patent. Therefore while it cuts the wire and releases one end it holds the other.

By means of the bevel-gear 99, that is actuated by one of the cogged segments on the side of the wheel 44, the shaft 100 (shown in dotted lines in Fig. 2) is rotated. It is provided with a crank 101, as therein shown, connected up with a vertical rod 102, to which are pivoted the handles 98 of the movable jaw 97 of the cutter. Said handles 98 are provided with a slot, through which they are secured pivotally to the bar 102, so as to have freedom of movement. The only purpose of this mechanism is to elevate and lower the handles 98. When the tying process is as shown in Fig. 9 and afterward until the twisting has commenced, the handles 98 and the holder and cutter mechanism are in the position shown in Figs. 2, 9, and 16. Then the bevel-gear 99 begins to operate, and the first movement lowers the rod 102 and opens the jaw, whereby the end of the wire 51, as seen in Fig. 9, is released, and the strand of wire extending from the spool to the end of the needle automatically enters between the jaws. The operation of the bevel-gear 99 continues and elevates the rod 102, thus closing the jaws of the cutter and holder and, as has been said, releasing the end of the wire running to the tier and holding the end of the wire running to the spool until another bale has been tied. The needle is then returned by the link 55 and the mechanism connected therewith to the position shown in dotted lines, and the plunger proceeds to pack the next bale in against the wire extending from the spool to the wire-holder, and as said bale is formed it pushes out the preceding bales that have been tied and actuates the gage-wheel 34.

It is observed that all of the bevel-wheels 58, 66, 73, and 99 operate in succession. The location of the cogged segments 59 on the sides of the wheels 44 and 45 must be such as to bring about this result. This is readily determined as well as the proper length of such cogged segments to effect the said results. As soon as the wheel 8 begins to operate the bevel-gear 58 begins to operate and bring the needle into the position shown in Fig. 1. As soon as it has done so the bevel-gear 73 begins to operate to elevate the tiers into place for tying the wires. As soon as this has been done the bevel-gear 66 begins to operate to twist the wires, and as soon as the twisting has commenced the bevel-gear 99 begins to operate to release and cut the wires. As soon as these have ceased the bevel-gear 58 begins to operate to return the needle shown in dotted lines in Fig. 1, and as soon as this has been done the said spur-wheel 8 has made one revolution, and the piece 13 has, by reason of the spring 17, (seen in Figs. 4 and 6,) been forced into the notch in the stationary wheel 11, whereby the wheel 8 is thrown out of gear. Then the bale-tying mechanism stands still until the cam-wheel 28 has made another revolution, whereupon the entire operation which has been described will recur.

Attention is called to the box 103, (seen in Figs. 11 and 13,) which is secured on the shafts adjacent to each of the bevel-wheels 58, 66, 73, and 99 and which turns with said shafts. It is provided with a flat face that bears against the smooth edge of the rim of the wheel 44 or 45, as the case may be, and prevents the rotation of said pinions and the movement of any of the parts they are to drive when said pinions are not in engagement with the cogged segments 59. This is for the purpose of throwing these parts of the tier mechanism in and out of gear at the proper times. When the box 103 enters the indentation in the wheel-rim the little bevel-gear 58 engages the cogged segment, while at all other times such gear is held out of engagement with the cogged segment.

It is believed from the preceding description the full nature of my invention will be understood. It will be observed that a different knotter or tier might be used instead of the one here shown in connection with the remainder of the mechanism, as I have used with it the tier shown in my prior patent above referred to. The purpose of this improvement is to avoid the necessity of tying the wire by hand; also, to do the tying automatically, rapidly, and turn out bales of uniform size.

What I claim as my invention, and desire to secure by Letters Patent, is—

1. In a bale-tying machine, the combination with a tying mechanism, of a suitable trip for starting the same, a gage-wheel, that is actuated by the bales as they pass through the press, having a series of concentric gears thereon, a shaft for actuating the trip, and a gear adjustably mounted on such shaft so that it can be made to mesh with any of the gears on the gage-wheel.

2. In a bale-tying machine, the combination with the tying mechanism, of a clutch for starting the same, a rock-shaft provided with an arm to actuate the clutch and also an arm near the plunger, and a finger on the plunger to engage the latter arm and actuate said rock-shaft.

3. In a bale-tying machine, a fly-wheel provided with an internal gear, a wheel to drive the tying mechanism having a radial slot through it, a connecting-clutch comprising a bar extending through such opening and an arm extending therefrom with teeth on its outer end that will engage with the internal gear on the fly-wheel, and a guide-bracket on said drive-wheel through which the clutch can reciprocate.

4. In a bale-tying machine, a fly-wheel provided with an internal gear, a wheel to drive the tying mechanism having a radial slot or opening through it, a connecting-clutch comprising a bar extending through such opening and an arm extending therefrom with teeth on its outer end that will engage with the internal gear on the fly-wheel, a guide-bracket on said drive-wheel through which the clutch can reciprocate, and a spiral spring between such bracket and clutch-bar.

5. In a bale-tying machine, a fly-wheel provided with an internal gear, a wheel to drive the tying mechanism having a radial slot or opening through it, a clutch comprising a bar extending through such opening with an arm on it extending to the internal gear and having teeth thereon to engage such gear, a guide-bracket on the drive-wheel in which the clutch reciprocates, a rock-shaft provided with an arm to actuate such clutch and also an arm near the plunger, and a finger on the plunger to engage the latter arm and actuate said rock-shaft.

6. In a bale-tying machine, a fly-wheel provided with an internal gear, a wheel to drive the tying mechanism having a radial slot or opening through it, a clutch comprising a bar extending through such opening with an arm on it extending to the internal gear and having teeth thereon to engage such gear, a guide-bracket on the drive-wheel on which the clutch reciprocates, a rock-shaft provided with an arm to actuate such clutch and also an arm near the plunger, a finger on the plunger to engage the latter arm and actuate said rock-shaft, and a stationary wheel adjacent to the drive-wheel, on whose periphery such clutch-arm is adapted to ride when the clutch is in engagement and having a notch in the periphery that registers with the opening in the drive-wheel into which the clutch-arm will drop and thereby the clutch become disengaged.

7. In a bale-tying machine, a fly-wheel provided with an internal gear, a wheel to drive the tying mechanism having a radial slot or opening through it, a clutch comprising a bar extending through such opening with an arm on it, extending to the internal gear and having teeth thereon to engage such gear, a guide-bracket on the drive-wheel on which the clutch reciprocates, a rock-shaft provided with an arm to actuate such clutch and also an arm near the plunger, a finger on the plunger to engage the latter arm and actuate such rock-shaft, a third arm on said rock-shaft, and a suitable trip to engage such latter arm and thereby hold said rock-shaft so that the arm thereon adjacent to the plunger will not be in position to be actuated thereby.

8. In a bale-tying machine, a trip for starting the tying mechanism that is actuated by the return stroke of the plunger, a cam-wheel to operate said trip and place it in position to be engaged by the plunger, a shaft upon which said cam-wheel is loosely mounted, a ratchet-and-pawl connection between said shaft and cam-wheel, a gage-wheel actuated by the bales as they pass through the press, and means whereby said gage-wheel will drive said shaft.

9. In a bale-tying machine, a fly-wheel provided with an internal gear, a wheel for driving the tying mechanism loosely mounted on the fly-wheel shaft beside the fly-wheel and having a radial slot through it, an arm secured to the hub of said drive-wheel to connect it with the internal gear of the fly-wheel, a spring-actuated trip mounted in the arm secured to the hub of the drive-wheel, means for operating said trip when a bale is ready to tie, a rock-shaft provided with three arms rigidly secured thereto, one of said arms resting upon said trip, another of said arms adapted to engage the clutch when the trip acts and a third of said arms adjacent to the press-frame, and a finger extending from the plunger that will engage said last-named arm when the trip has released the first-named arm on said rock-shaft and will thereby actuate said rock-shaft and cause the second-named arm thereon to actuate the clutch.

10. In a bale-tying machine, a fly-wheel provided with an internal gear, a wheel for driving the tying mechanism mounted loosely on the fly-wheel shaft beside the fly-wheel and having a radial opening therein, a clutch-bar extending through such radial opening and having an arm with teeth on it to engage the internal gear, a suitable wheel mounted beside said fly-wheel with a notch in its periphery that registers with the opening in the drive-wheel, the diameter of said stationary wheel being such that when the clutch engages the fly-wheel it will ride upon the periphery of said stationary wheel until one revolution is made when the clutch will drop into the notch in said stationary wheel and disengage the fly-wheel.

11. In a bale-tying machine, a wheel for driving the tying mechanism, a clutch for starting or stopping such wheel, a gage-wheel that is actuated by the bales as they pass through the press for throwing the clutch into gear, and a stationary wheel that holds said clutch in gear while the drive-wheel is making one revolution and then stopping the same.

12. In a bale-tying machine, a needle, a tier, a twister, and a wire holder and cutter, means for operating each, and a pair of wheels to drive the same with cogged segments thereon so placed with relation to each other that they will begin to operate *seriatim* to actuate said needle, tier, twister, and wire holder and cutter in the order named.

13. In a bale-tying machine, a wheel for driving the tying mechanism with its rim partly cut out on one side and having a cogged segment at such cut-out portion, a shaft for operating the tying mechanism with a box non-rotatable thereon that has one flat face adapted to be engaged by the edge of the rim of the drive-wheel, and a pinion on the shaft to mesh with the cogged segment when the shaft-box enters the indentation in the wheel-rim, whereby the shaft will not turn when such pinion is not in engagement.

14. In a bale-tying machine, a needle that reciprocates through the press behind the bale, a lever pivoted at one end to the press-frame and at the other end through a slot to the shank of the needle, a driving-wheel, a crank actuated thereby, and a rod connecting the crank and lever.

15. In a bale-tying machine, the combination with a holder of the free end of the wire, a needle to move the other end of the wire across the former, a twister mounted beneath such crossing, and means for elevating the twister into engagement with the wires when they are crossed.

16. In a bale-tying machine, the combination with a holder of the free end of the wire, a needle to move the other end of the wire across the former, a twister comprising a frame, a pair of wheels mounted therein with a twisting-prong on each, means for driving said wheels in opposite directions, said twister mounted beneath such crossing, and means for elevating the twister into engagement with the wires when they are crossed.

17. In a bale-tying machine, a tier comprising a frame having a pair of parallel guide-prongs that extend beyond the other parts and have a passage-way between them, an open ring-bearing mounted between the two guide-prongs with its opening in line with such passage-way, a wheel mounted on such bearing on each side of the tier having a hollow center with a radial passage-way into the same that registers with the other passage-way, a twister-prong on each wheel, and means for rotating the wheels in opposite directions.

18. In a bale-tying machine, means for bringing the tie-wires across each other to be tied, a tier mounted beneath the crossing of said wires having a suitable twisting mechanism therein, means for elevating said tier into engagement with the wires, a wheel provided with a cogged segment to drive such elevating mechanism, means for actuating the twister of the tier, a wheel provided with a cogged segment to actuate such twister mechanism, and a single drive-wheel for operating both of the wheels upon which said cogged segments are secured, said cogged segments being so placed upon such wheels that the one driving the elevating mechanism will operate first and the one driving the twister mechanism immediately thereafter.

19. In a bale-tying machine, a needle for carrying the wire so that the two ends will cross for tying, means for operating said needle, a wheel provided with a cogged segment to actuate such mechanism, a tier mounted beneath the crossing of the wires, mechanism for elevating the same into engagement with the wires, a wheel provided with a cogged segment to actuate such mechanism, means for actuating the tier after it is elevated, a wheel provided with a cogged segment to actuate such means, and a drive-wheel for actuating all the wheels upon which such cogged segments are secured, such cogged segments being so placed with relation to each other that they will operate in succession in the order named.

20. In a bale-tying machine, a holder and cutter for the wires, a handle for supporting the same, a wheel provided with a cogged segment, suitable connecting mechanism whereby such cogged segments will operate the handle so as to release the held end of the wire, and then to cut the other end of the wire.

In witness whereof I have hereunto set my hand this 3d day of February, A. D. 1897.

ABRAHAM AMANNS.

Witnesses:
JOSEPH A. WRIGHT,
MARION DICKEY.